United States Patent
Hieda

Patent Number: 5,995,141
Date of Patent: *Nov. 30, 1999

[54] IMAGE PICK-UP DEVICE WITH A MOTION DETECTION CIRCUIT AND A MEMORY CONTROL CIRCUIT

[75] Inventor: Teruo Hieda, Yokohama, Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/518,804

[22] Filed: Aug. 24, 1995

[30] Foreign Application Priority Data

Aug. 26, 1994 [JP] Japan ................................ 6-202009

[51] Int. Cl.⁶ ............................................ H04N 5/228
[52] U.S. Cl. ..................................... 348/208; 348/231
[58] Field of Search ............................ 348/207, 208, 348/231, 155, 699, 700, 701; 396/52, 53, 55; H04N 5/228

[56] References Cited

U.S. PATENT DOCUMENTS

| | | | |
|---|---|---|---|
| 4,712,138 | 12/1987 | Kyuma et al. | 348/301 |
| 4,748,506 | 5/1988 | Hieda | 348/230 |
| 4,814,861 | 3/1989 | Hieda | 348/256 |
| 4,833,538 | 5/1989 | Hieda | 348/239 |
| 4,884,128 | 11/1989 | Hieda | 348/235 |
| 4,963,982 | 10/1990 | Hieda | 348/298 |
| 5,107,293 | 4/1992 | Sekine et al. | |
| 5,371,539 | 12/1994 | Okino et al. | 348/208 |
| 5,469,210 | 11/1995 | Noguchi et al. | 348/208 |
| 5,502,484 | 3/1996 | Okada | 348/208 |
| 5,563,652 | 10/1996 | Toba et al. | 348/208 |
| 5,796,427 | 8/1998 | Suzuki | 348/208 |

*Primary Examiner*—Tuan Ho
*Attorney, Agent, or Firm*—Fitzpatrick, Cella, Harper & Scinto

[57] ABSTRACT

An image pick-up device comprises an image pick-up optical system for focusing an optical image of an object, an image pick-up element having a predetermined number of pixels for photo-electrically converting the optical image focused by the image pick-up optical system to produce an image pick-up signal, a signal processing circuit for processing the image pick-up signal from the image pick-up element to generate image data, a first memory for storing the image data from the signal processing circuit by image unit, a second memory having a size capable of storing larger image information than the number of pixels of the image pick-up element for storing the image data read from the first memory, a motion detection circuit for detecting a motion of the image pick-up optical system, and a memory control circuit for controlling the reading from the first memory and the writing to the second memory based on the detection by the motion detection circuit.

14 Claims, 5 Drawing Sheets

IMAGE PICK-UP DEVICE WITH A MOTION DETECTION CIRCUIT AND A MEMORY CONTROL CIRCUIT

BACKGROUND OF THE INVENTION

1. Field of the Invention

The present invention relates to an image pick-up device, and more particularly to an image pick-up device for outputting a picked-up image as digital image data.

2. Related Background Art

It has been widely conducted to utilize an output image from an image pick-up device in other device as image data. For example, image data is outputted to an image printer for print-out or the image data is read into a personal computer and combined with characters and graphs to prepare a report and it is further printed out by a color printer.

Two major systems for the configuration of such a system have been known.

In the first system, a conventional analog video signal is generated in the image pick-up device and it is outputted to an extension board expanded in a personal computer or an image printer, analog-digital converted by an AD converter, the digital video signal is stored in a field memory or a frame memory, and the stored image data is outputted to the personal computer or the image printer through an interface circuit.

In the second system, a digital video signal is generated in the image-pick-up device and it is stored in a field memory or a frame memory provided in the image pick-up device and the stored image data is outputted to the external personal computer or image printer through the interface circuit provided in the image pick-up device.

However, the prior art device has the following problems.

First, the biggest problem is the number of pixels of the image pickup device. The above device mostly uses image pick-up elements in accordance with a standard television system. The number of pixels of the image pick-up device is in the order of 500×500 for a popular type and in the order of 800×600 for a high number of pixels type. When it is to be printed by a 300 dpi printer, an image size is only approximately 40 to 60 mm and when a larger size is to be printed, a resolution of the image is reduced which results in a coarse image.

A special purpose image pick-up device uses more pixels, in the order of 1000×1000 but even with such a device, the printed image size is only approximately 80 mm square. Since the area of such image pick-up device is very large, a manufacturing yield is very low. Further, since a driving frequency is very high such as 30 to 40 MHz, a cost of the device is very high and it is not practical for common use. An image size which is practically required is in the order of 200×150 mm and the prior art device cannot attain such an image size.

Another problem is an image quality. In the first system of the prior art device, since the analog video signal is first generated and then it is converted to the digital image data, a color band is narrow because of a limitation by the specification of the standard television system. As a result, the colors spread when the image is displayed on a display device of the personal computer or printed by the printer. In the second system, the image is distorted in a periphery by the aberration of an image pick-up lens or the colors spread, which result in the degradation of the image quality.

SUMMARY OF THE INVENTION

It is a first object of the present invention to solve the above problems and provide an image pick-up device which can produce an image of large size and high quality.

It is a second object of the present invention to provide an image pick-up device which can produce an image of large size and high quality from a plurality of image information.

In order to achieve the above objects, in accordance with a preferred embodiment of the present invention, there is provided an image pick-up device comprising: an image pick-up optical system for focusing an optical image of an object; an image pick-up element having a predetermined number of pixels for photo-electrically converting the optical image focused by said image pick-up optical system to produce an image pick-up signal; a signal processing circuit for processing the image pick-up signal from said image pick-up element to generate image data; a first memory for storing the image data from said signal processing circuit by image unit; a second memory having a size capable of storing larger image information than the number of pixels of said image pick-up element for storing the image data read from said first memory; motion detection means for detecting a motion of said image pick-up optical system; and memory control means for controlling the reading from said first memory and the writing to said second memory based on the detection by said motion detection means.

In accordance with another embodiment of the present invention, there is provided an image pick-up device comprising the image pick-up optical system, the image pick-up element, the signal processing circuit, the first and second memories and the memory control means, all defined above as well as control means for controlling the reading from said first memory and the writing to said second memory based on the detection by said motion detection means.

Other objects and features of the present invention will be apparent from the following description of the specification and the accompanying drawings.

DETAILED DESCRIPTION OF THE PREFERRED EMBODIMENTS

Figure 1:
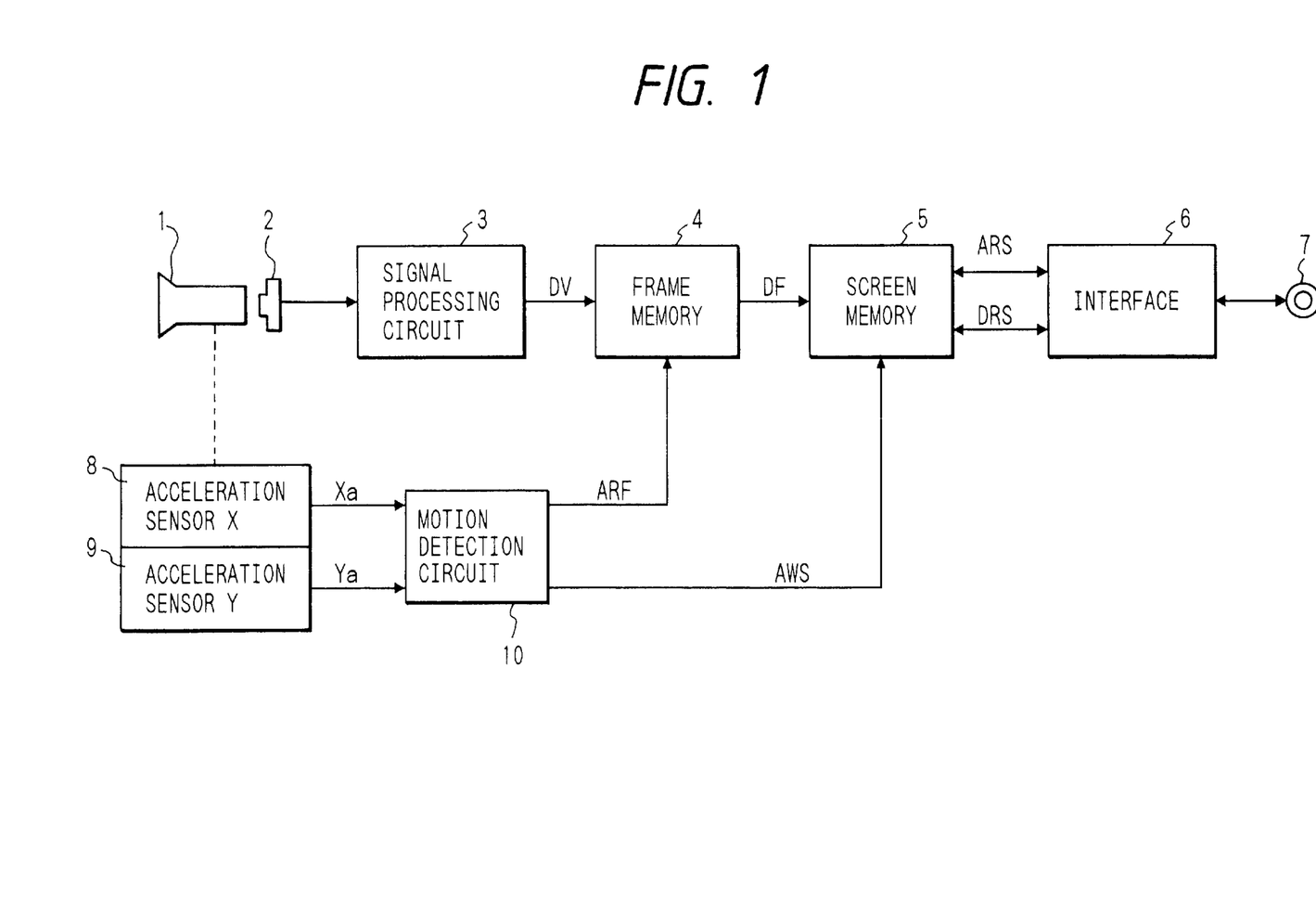
FIG. 1 shows a block diagram of a first embodiment of the present invention.

FIG. 1 shows a first embodiment of the present invention. In FIG. 1, numeral 1 denotes an image pick-up optical system and numeral 2 denotes an image pick-up device comprising a CCD having a predetermined number of pixels. Numeral 3 denotes a signal processing circuit for analog-digital converting an output of the image pick-up device 2 and digitally processing it such as gamma correction or clipping to generate a video signal and numeral 4 denotes a frame memory as a first memory for storing the signal-processed digital video signal DV as image data and having a size determined by the number of pixels of the image pick-up element. Numeral 5 denotes a screen memory as a second memory for string the image data in an area broader than the size of the frame memory 4, numeral 6 denotes an interface for delivering the content of the screen memory 5 to an external, and numeral 7 denotes a connection terminal for connection to an external equipment such as a personal computer, not shown.

Numeral 8 denotes an acceleration sensor X mechanically coupled to the image pick-up optical system 1 for detecting an acceleration of horizontal motion of the image pick-up optical system 1, numeral 9 denotes an acceleration sensor y for detecting a vertical acceleration of the image pick-up optical system 1, and numeral 10 denotes a motion detection circuit for forming a motion signal from acceleration signals Xa and Ya supplied from the acceleration sensor X and Y, 8 and 9 to generate a read address signal ARF of the frame memory 4 and a write address signal AWS of the screen memory 5 by the motion signal. The frame memory 4 may be a field memory but for the purpose of simplification, the frame memory is used in the following description. The acceleration sensors X and Y, 8 and 9 and the motion detection circuit 10 form motion detection means. The motion detection circuit 10 also functions as memory control means.

An operation is described below.

An object image, not shown, passes through the image pick-up optical system 1 and is focused on a photo-electric conversion plane of the image pick-up device 2 and converted to an image pick-up signal. The image pick-up signal is analog-digital converted and digitally processed by the signal processing circuit 3 to produce the video signal DV. The video signal DV is sequentially written into the frame memory in the order of scan as the image data. Then, the data designated by the read address signal ARF from the motion detection signal 10 is read as the data DF. The data DF is written to a location designated by the write address signal AWS from the motion detection circuit 10.

The screen memory 5 is written with a plurality of frames of data DF read from the frame memory 4 to store the video signal of a larger area than the area stored in the frame memory 4 having the size determined by the number of pixels of the image pick-up device 2. The screen memory 5 receives a control command from the external equipment such as the personal computer, not shown, connected to the connection terminal 7 through the interface 6 so that the data of the designated area is read.

On the other hand, the acceleration sensor X 8 and the acceleration sensor Y 9 detect the accelerations of the X and Y motions of the image pick-up optical system 1. They detect the direction of movement of the present device by an operator. The direction of movement of the image is determined through the present detection. The sensor outputs are integrated by the motion detection circuit 10 to convert them to a motion vector, and the read address signal ARF of the frame memory 4 is generated based on the motion vector. The motion vector is integrated to convert it to position information, and the write address signal AWS of the screen memory 5 is generated based on the position information and the motion vector information.

As described above, the data of the screen memory 5 is read by the external equipment such as the personal computer. For example, when a program for serially reading the screen memory 5 by the personal computer and displaying it on a graphic display device is executed, the image written into the screen memory 5 from the frame memory 4 may be monitored. The operator may move the entire present device while watching the monitor image, that is, may move the image pick-up optical system 1 to produce a desired image.

Figure 2:
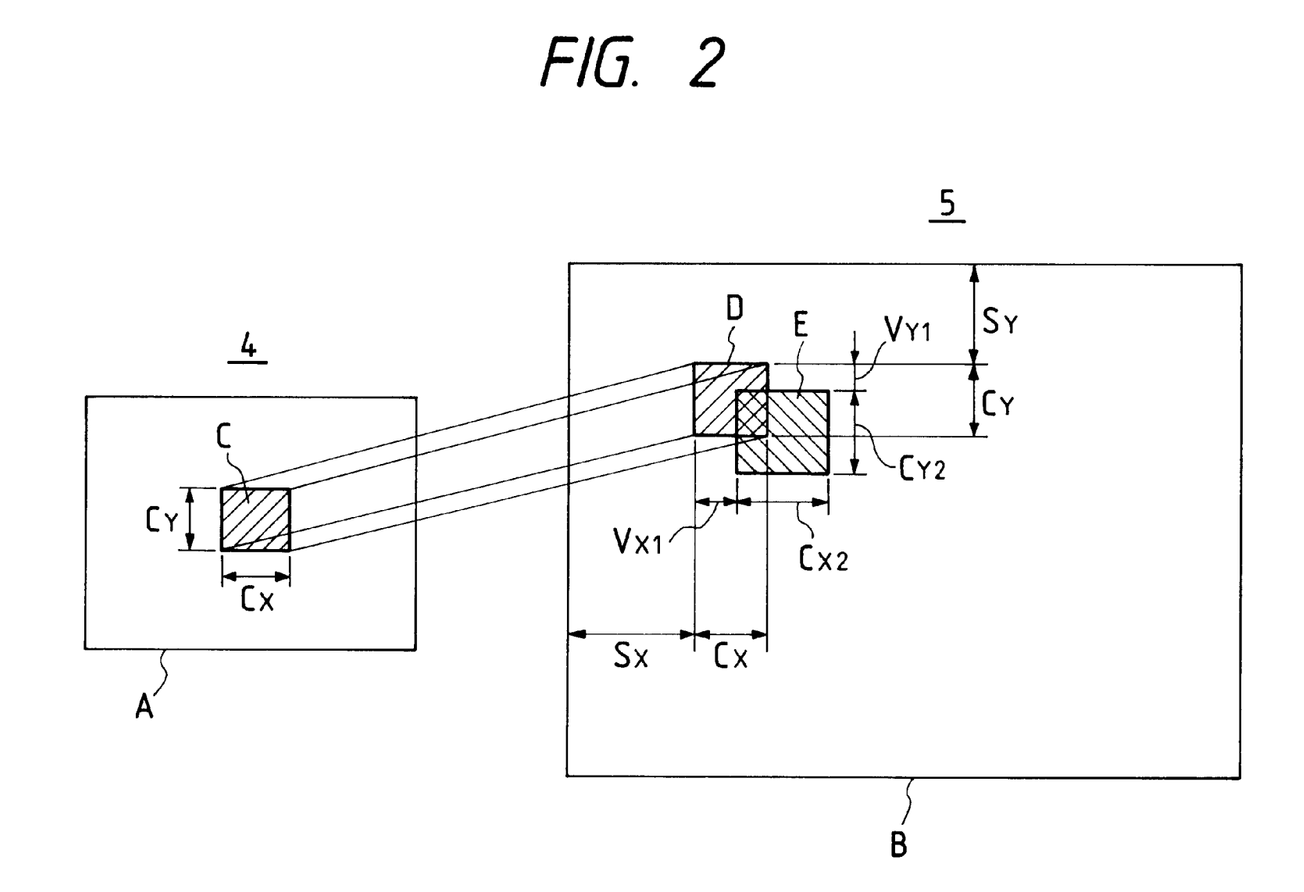
FIG. 2 shows a configuration for illustrating the address generation of a memory by detecting motion.

FIG. 2 illustrates an operation.

A denotes an area of the frame memory 4, which is identical to the image pick-up area of the image pick-up device 2. B denotes a memory area of the screen memory 5, which is larger than A. C denotes a center area of A having a horizontal size Cx and a vertical size Cy. D denotes an area in the memory area B of the screen memory 5, which is of identical size to C and the area having a horizontal size Sx and a vertical size Sy of the position information detected by the motion detection circuit 10.

In FIG. 2, the data in the area C is sequentially written into the area D. The sizes Cx and Cy of the area C are determined for the X component Vx of the motion vector detected by the motion detection circuit 10 as:

$$Cx = Vx_0 \text{ when } Vx \geq Vx_0, \qquad (1)$$

where $Vx_0$ is a predetermined number $$Cx = Vx \text{ when } Vx > Vx_0 \qquad (2)$$

Thus, when Vx is smaller than the predetermined value $Vx_0$, Cx is constant and when it is larger, Cx increases as Vx increases. Cy may also be determined in the same manner. By this determination, the area of the constant area is always updated even if the amount of motion on the screen memory 5 is small.

E in FIG. 2 denotes the area which is written with the next frame to the frame written into D. $Vx_1$ and $Vy_1$, denote the sizes of the motion vector in the frame when D is written. $Cx_1$ and $CY_2$ denote the sizes of the write area in the current frame. As seen from FIG. 2, Cx is larger than Cy because the sizes of the motion vector in the current frame are larger than $Vx_0$ and $Vy_0$.

In this manner, a portion of the data in the frame memory 4 is read in accordance with the motion vector detected by the motion detection circuit 10 and the position information and it is written into the screen memory 5. By repeating the above process, the data is written into the screen memory 5 which is larger than the image size determined by the number of pixels of the image pick-up device 2.

The operator pans or tilts the present device toward the unpicked area while watching the image read out of the screen memory 5 and sequentially displayed on the graphic display device of the personal computer so that the image of gradually expanding image pick-up area is produced.

Figure 3:
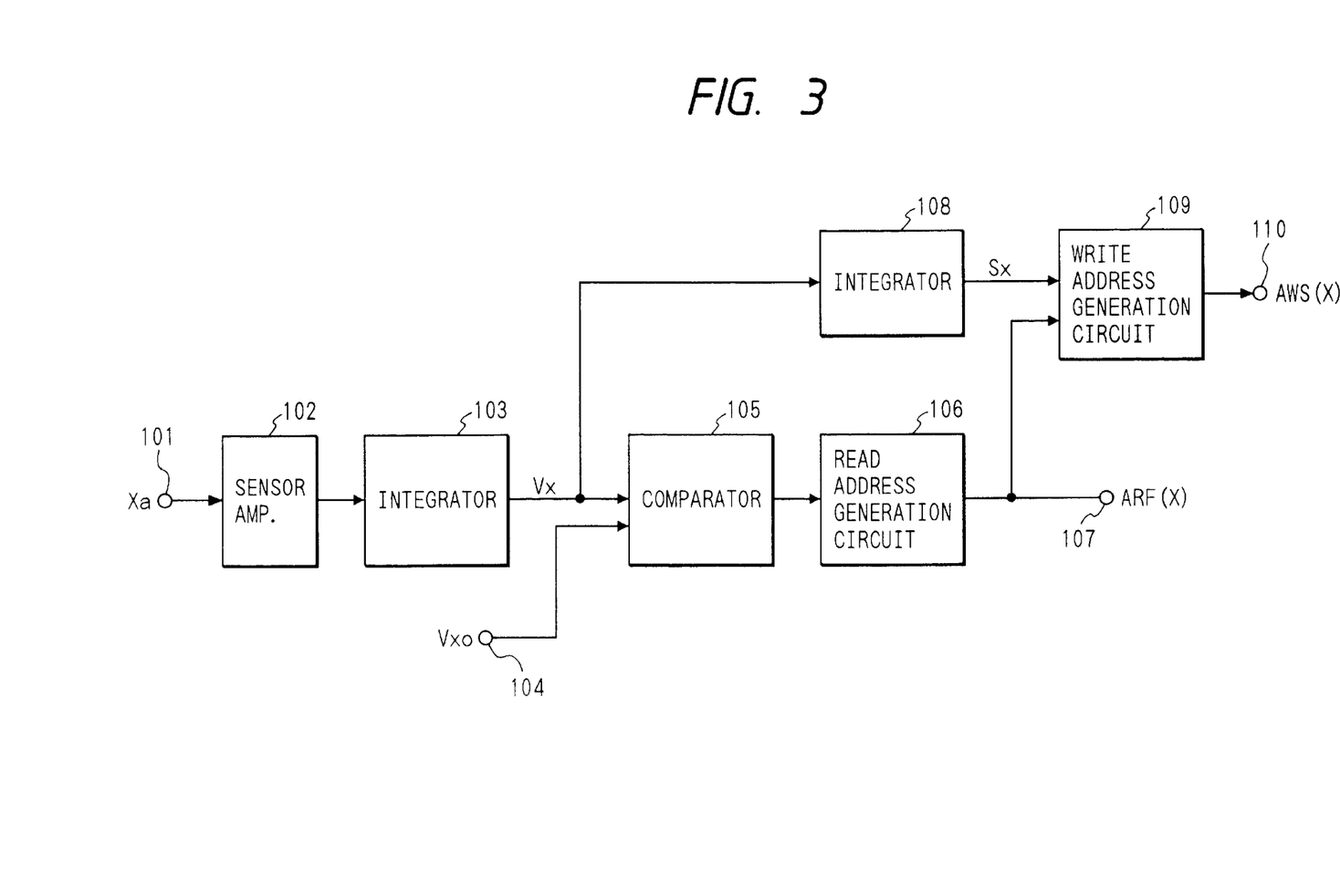
FIG. 3 shows a block diagram of an embodiment of a motion detection circuit used in the first embodiment.

FIG. 3 shows an embodiment of the motion detection circuit 10. In FIG. 3, for the purpose of simplification, only the horizontal circuit is shown although the actual motion detection circuit 10 has a vertical circuit of the substantially identical configuration.

Numeral 101 denotes an input terminal for the detection signal Xa from the acceleration sensor X 8, numeral 108 denotes a sensor amplifier for amplifying the small detection signal Xa of the acceleration sensor X 8, numerals 103 and 108 denote integrators, numeral 104 denotes an input terminal for a reference voltage $Vx_0$, numeral 105 denotes a voltage comparator, numeral 106 denotes a read address generation circuit for generating a X component ARF (X) of the read address of the frame memory 4, numeral 107 denotes an output terminal of the ARF (X), numeral 109 denotes a write address generation circuit for generating a X component AWS (X) of the write address of the screen memory 5 and numeral 110 denotes an output terminal of the AW (X).

In the above configuration, the detection signal Xa of the acceleration sensor X 8 is applied to the input terminal 101, amplified by the sensor amplifier 103 by a predetermined gain and integrated by the integrator 103 to produce the motion vector Vx. The Vx is first compared with the reference voltage $Vx_0$ from the input terminal 104. Based on the comparison result, the read address ARF (X) is generated by the read address generation circuit 106 and it is outputted from the output terminal 107. As seen from FIG. 2 and the formulas (1) and (2), the ARF (X) starts from the center C of the frame memory 4, and when Vx is smaller than $Vx_0$, the address in the range corresponding to $Vx_0$ is generated, and when Vx is larger than $Vx_0$, the address in the range corresponding to Vx is generated.

On the other hand, the output Vx of the integrator 103 is further integrated by the integrator 108 to produce the position information Sx. The write address generation circuit 109 generates the write address AWS (X) of the screen memory 5 based on Sx and ARF (X) and it is outputted from the output terminal 110. The AWS (X) is generated such that the data is written into the area of Cx determined in the manner described above from the start point of the current motion vector on the screen memory 5 as shown in FIG. 2.

In the above description, only the horizontal component has been discussed although the circuit for processing the vertical component, which is essentially identical to that of FIG. 3 is actually provided so that the vertical component ARF (Y) of the read address and the vertical component AWS (Y) of the write address are generated and they are combined with the ARF (X) and AWS (X) to output the ARF and AWS.

Figure 4:
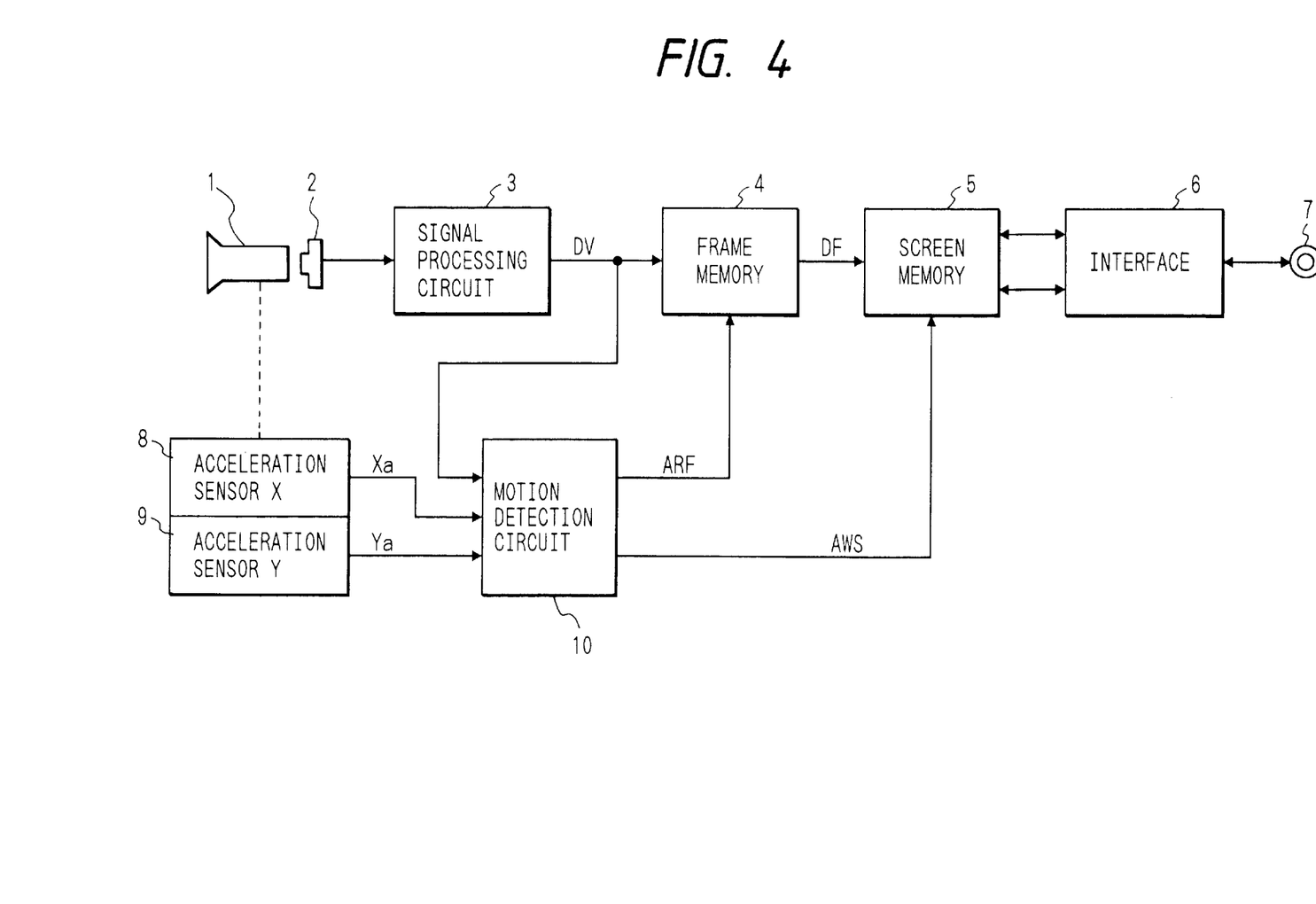
FIG. 4 shows a block diagram of a second embodiment of the present invention.

FIG. 4 shows a second embodiment of the present invention in which the like elements to those shown in FIG. 1 are designated by the like numerals and the explanation thereof is omitted.

In the second embodiment, the outputs Xa and Ya of the acceleration sensor X 8 and the acceleration sensor Y 9 and the output DV of the signal processing circuit 3 are applied to the motion detection circuit 10.

In the motion detection circuit 10, the motion vector is determined from the outputs of the both acceleration sensors X and Y, 8 and 9, as it is in the first embodiment, the motion vector of the image is determined from the output DV of the signal processing circuit 3, and based on the both motion vectors, the read address ARF of the frame memory 4 and the write address AWS of the screen memory 5 are determined. Thus, a high precision motion vector can be determined.

As a result, a distortion of the image combined on the screen memory 5 is very small. The degradation of the precision does not occur even if the motion is less and the output level from the acceleration sensor is small. Further, an error due to a DC drift by the change of temperature of the acceleration sensor or the aging and a noise can be prevented.

This is attained because the detection of the motion vector from the video signal is of high precision because it uses the pattern matching but produces the error or erroneous response to a large motion while the detection of the motion vector from the acceleration sensor produces a small error to a large motion but produces a large error when the motion is small or almost still due to the drift and noise of the sensor, and those are combined to enhance the advantages and cancel the disadvantages. Thus, a high precision and stable motion detection is attained for both the small motion and the large motion.

Figure 5:
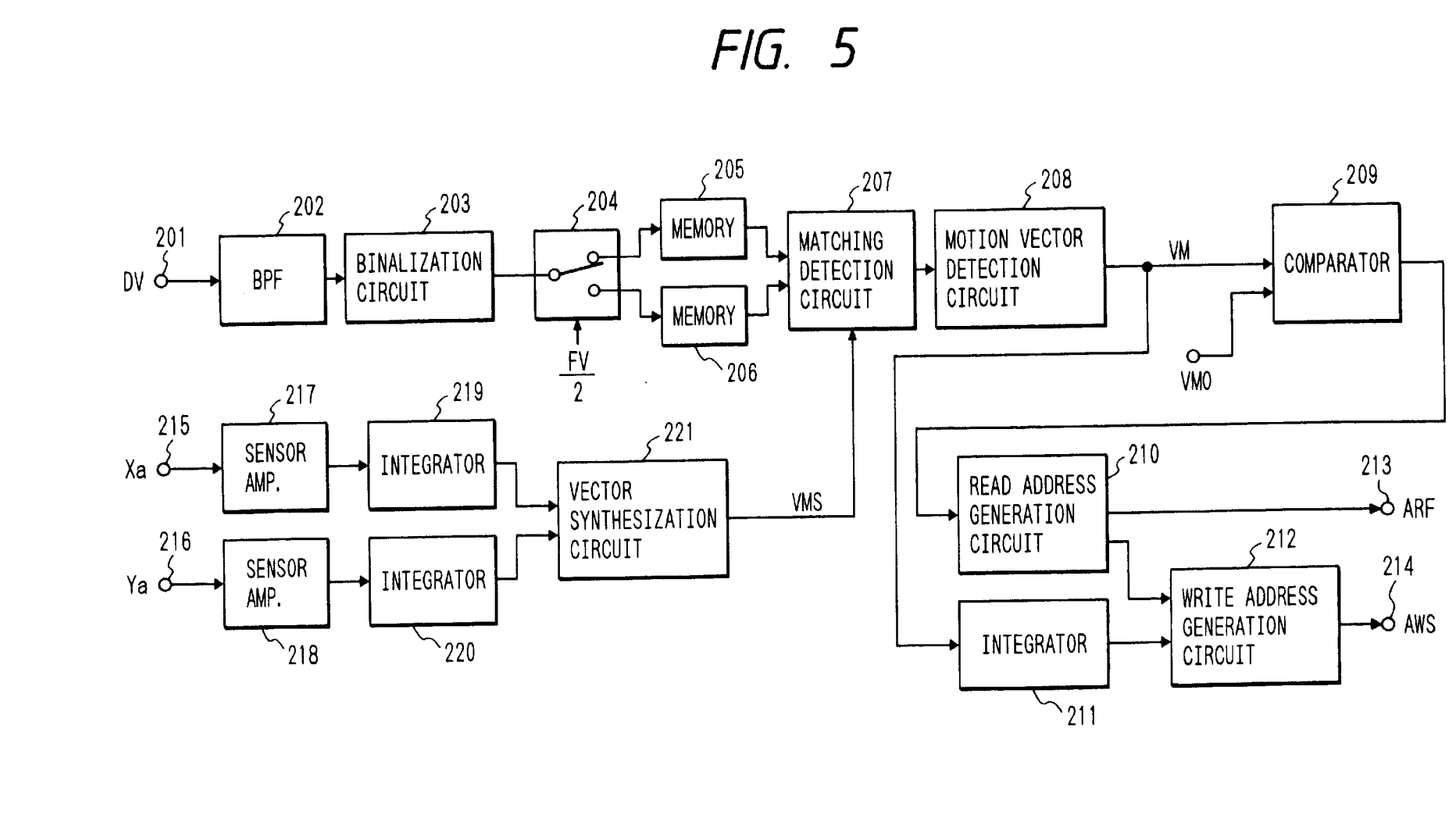
FIG. 5 shows a block diagram of an embodiment of the motion detection circuit used in the second embodiment.

FIG. 5 shows an embodiment of the motion detection circuit 10 used in FIG. 4.

Numeral 201 denotes an input terminal for the video signal DV, numeral 202 denotes a band-pass filter, numeral 203 denotes a binarization circuit for comparing an input signal with a predetermined level to produce a binary signal depending on the magnitude, numeral 204 denotes a switch, numerals 205 and 206 denote memories for storing one frame of binarized image signal, numeral 207 denotes a matching detection circuit for detecting a correlation value while two input images are relatively and slowly moved, numeral 208 denotes a motion vector detection circuit for detecting the motion vector form a maximum position of the input matching signal, and numeral 209 denotes a comparator for outputting the reference value when the input value VM is smaller than the reference value VMO and outputting the input value when the input value is larger.

Numeral 210 denotes a read address generation circuit for generating the read address ARF of the frame memory 4 from the value of the input motion vector, numeral 211 denotes an integrator, numeral 212 denotes a write address generation circuit for generating the write address of the screen memory 5 from the input position signal and read address, numeral 213 denotes an output terminal for the read address ARF of the frame memory 4, numeral 214 denotes an output terminal for the write address AWS of the screen memory 5, numeral 215 denotes an input terminal for the output signal Xa of the acceleration sensor X 8, numeral 16 denotes an input terminal for the output signal Ya of the acceleration sensor Y 9, numerals 217 and 218 denote sensor amplifiers for amplifying the small output signals of the acceleration sensors to appropriate levels, numerals 219 and 220 denote integrators and numeral 221 denotes a vector combination circuit for combining the horizontal and vertical motion vectors.

In the above configuration, the output signals of the acceleration sensors X and Y, 8 and 9 are supplied to the sensor amplifiers 217 and 218 through the input terminals 215 and 216, respectively, and amplified by the predetermined gain, and integrated by the integrators 219 and 220 to produce the horizontal and vertical motion vector components. The motion vectors are combined by the vector combination circuit 221 to form a motion vector VMS by the acceleration sensors and it is applied to the matching detection circuit 207. The matching detection circuit 207 conducts the correlation operation while changing the relative position of the two image signals as will be described later and the center of the range of change of the relative position is determined by the VMS.

On the other hand, the output video signal DV of the signal processing circuit 3 is supplied from the video signal input terminal 201, supplied to the band-pass filter 202 which passes the frequency components of 1 to 3 MHz which is an appropriate frequency band for the pattern matching and the output therefrom is binarized by the binarization circuit 203. The output therefrom is alternately stored in the memories 205 and 206 at every frame by the switch 204. A pulse at a frequency of FV/2 (where FV is a frame frequency) is applied to the switch 204 from a timing generator, not shown, to alternately store the input to the two memories 205 and 206 at every frame.

The outputs of the respective memories are operated for correlation while changing the relative position in the matching detection circuit 207. As described above, the center of the relative position is set by the motion vector VMS by the acceleration sensors and the center position is changed in the predetermined range around the center to conduct the correlation operation. The motion vector detection circuit 208 detects the relative position for the largest correlation value at the output of the correlation operation as the motion vector value VM. The motion vector VM is compared with the reference value VMO by the comparator 209 and the read address ARF is generated by the read address generation circuit 210 based on the comparison result and it is outputted from the output terminal 213.

On the other hand, the motion vector VM is further integrated by the integrator 211 to produce the position information, and based on the position information and the ARF, the write address generation circuit 212 generates the write address AWS of the screen memory 5 and it is outputted from the output terminal 214. The AWS is generated such that the data is written in the range determined in the manner described above from the start point of the current motion vector on the screen memory 5.

In accordance with the above configuration and operation, since the center of the range for the correlation operation in the matching detection circuit 207 is determined by the motion vector VMS by the acceleration sensors, the range of the movement of the relative position may be narrowed so that the operation time is shortened or the precision of the matching detection is improved because the operation may be conducted while finely moving the position in the narrow range. Further, when the motion vector is determined by the image detection system, the erroneous detection which occurs when a repetitive pattern or quasi-repetitive pattern is moved. Further, the error due to the noise or the drift of the acceleration sensor can be compensated by the matching detection by the image detection and the precision is now lowered even for a small motion.

In accordance with the above embodiments, the pick-up image data is stored in the first memory and the second memory which is larger than the first memory is provided. On the other hand, the motion of the image pick-up optical system is detected and the first and second memories are controlled based on the detection to move the data of the first memory to the second memory. Thus, the image picked up in the wide range by panning or tilting can be stored in the second memory and read from the second memory to produce the large size image. Further, the high quality of image is attained by using the data of the high quality portion from the image data.

Further, by detecting both the motion of the image pick-up optical system and the motion of the image and controlling the first and second memories based on the detection, the high precision detection of motion is attained. Thus, the distortion of the image is reduced and the affect by the temperature change or aging of the acceleration sensor or the noise and the DC drift is reduced and higher precision and stable operation is attained.

What is claimed is:

1. An image pick-up device comprising:
   an image pick-up optical system for focusing an optical image of an object;
   an image pick-up element having a predetermined number of pixels for photo-electrically converting the optical image focused by said image pick-up optical system to produce an image pick-up signal;
   a signal processing circuit for digitally processing the image pick-up signal from said image pick-up element to generate image data;
   a first memory for storing the image data from said signal processing circuit by image unit;
   a second memory having a size capable of storing larger image information than the number of pixels of said image pick-up element for storing the image data read from said first memory;
   motion detection means for detecting a motion vector caused by a motion of said image pick-up optical system; and
   memory control means for controlling the reading from said first memory and the writing to said second memory, said memory control means controlling an address of said second memory for writing the image information read from said first memory to said second memory on the basis of the movement vector detected by said motion detection means so as to generate an image by combining a plurality of the image information read from said first memory.

2. A device according to claim 1, wherein said motion detection means is an acceleration sensor disposed on a camera.

3. A device according to claim 1, wherein said first memory is one of a frame memory and a field memory, and wherein the size of said second memory is capable of storing a plurality of images each of which can be stored in said first memory.

4. A device according to claim 1, further comprising an interface for transmitting an image read out from said second memory to an external equipment.

5. An image pick-up device comprising:
   an image pick-up optical system for focusing an optical image of an object;
   an image pick-up element having a predetermined number of pixels for photo-electrically converting the optical image focused by said image pick-up optical system to produce an image pick-up signal;
   a signal processing circuit for digitally processing the image pick-up signal from said image pick-up element to generate image data;
   a first memory for storing the image data from said signal processing circuit by image unit;
   a second memory having a size capable of storing larger image information than the number of pixels of said image pick-up element for storing the image data read from said first memory;
   motion detection means for detecting a motion of said image pick-up optical system and a motion of the image by the image data from said signal processing circuit; and
   memory control means for controlling the reading from said first memory and the writing to said second memory based on the detection by said motion detection means.

6. A device according to claim 2, wherein said memory control means generates an image having a larger number of pixels than an image stored in said first memory by using said second memory to perform motion correction on each of a plurality of images read out from said first memory and writes the motion corrected images into said second memory.

7. A device according to claim 2, wherein said memory control means generates an image of larger size than an image stored in said first memory by using said second memory to perform motion correction on each of a plurality of images read out from said first memory and writes the motion corrected images into said second memory.

8. a device according to claim 2, wherein said motion detection means includes an acceleration sensor disposed on a camera and a motion detection circuit for detecting motion of an image from the image pickup signal.

9. A device according to claim 2, wherein said first memory is one of a frame memory and a field memory, wherein the size of said second memory is capable of storing a plurality of images each of which can be stored in said first memory, and wherein said memory control means generates an image having a larger number of pixels than an image stored in said first memory by using said second memory to perform motion correction on each of a plurality of images read out from said first memory and writes the motion corrected images into said second memory.

10. A device according to claim 2, wherein said first memory is one of a frame memory and a field memory, wherein the size of said second memory is capable of storing a plurality of images each of which can be stored in said first memory, and wherein said memory control means generates an image of larger size than an image stored in said first memory by using said second memory to perform motion correction on each of a plurality of images read out from said first memory and writes the motion corrected images into said second memory.

11. A device according to claim 2, further comprising an interface for transmitting an image read out from said second memory to an external equipment.

12. An image pickup method comprising:

an image pickup step of photo-electrically converting an optical image formed by an image pickup optical system to produce an image pickup signal;

a signal processing step of digitally processing the image pickup signal produced by said image pickup step to generate image data;

a first storing step of storing in a first memory the image data output from said signal processing step;

a second storing step of storing image data read from the first memory into a second memory, the second memory having a size capable of storing larger image information than a number of pixels of the image data read from the first memory;

a motion detection step of detecting a motion vector caused by a motion of the image pickup optical system; and a memory control step of controlling the reading from the first memory and the writing to the second memory, said memory control step controlling an address of the second memory for writing thereto the image information read from the first memory on the basis of the movement vector detected by said motion detection step so as to generate an image by combining a plurality of the image information read from the first memory.

13. A method according to claim 12, wherein the first memory is one of a frame memory and a field memory, wherein the size of the second memory is capable of storing a plurality of images each of which can be stored in the first memory, and wherein said memory control step generates an image having a larger number of pixels than an image stored in the first memory by using the second memory to perform motion correction on each of a plurality of images read out from the first memory and writes the motion corrected images into the second memory.

14. A method according to claim 12, wherein the first memory is one of a frame memory and a field memory, wherein the size of the second memory is capable of storing a plurality of images each of which can be stored in the first memory, and wherein the memory control step generates an image of larger size than an image stored in the first memory by using the second memory to perform motion correction on each of a plurality of images read out from the first memory and writes the motion corrected images into the second memory.

* * * * *

UNITED STATES PATENT AND TRADEMARK OFFICE
CERTIFICATE OF CORRECTION

PATENT NO. : 5,995,141
DATED : November 30, 1999
INVENTOR(S) : Teruo Hieda

Page 1 of 1

It is certified that error appears in the above-identified patent and that said Letters Patent is hereby corrected as shown below:

Column 2:
Line 62, "string" should read --storing--.

Column 4:
Line 25, "$CY_2$" should read --$Cy_2$--.

Column 6:
Line 4, "form" should read --from--.

Column 7:
Line 39, "affect by the" should read --effect of--
Line 42, "is" should read --are--.

Signed and Sealed this

Twenty-sixth Day of June, 2001

*Attest:*

NICHOLAS P. GODICI
*Attesting Officer*    *Acting Director of the United States Patent and Trademark Office*